United States Patent
Hamilton et al.

(10) Patent No.: US 11,598,865 B2
(45) Date of Patent: Mar. 7, 2023

(54) SENSOR ASSEMBLY WITH CLEANING

(71) Applicant: Ford Global Technologies, LLC, Dearborn, MI (US)

(72) Inventors: Tyler D. Hamilton, Farmington, MI (US); Michael Robertson, Jr., Garden City, MI (US); Ashley Lucas, Novi, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 830 days.

(21) Appl. No.: 16/441,390

(22) Filed: Jun. 14, 2019

(65) Prior Publication Data
US 2020/0393550 A1    Dec. 17, 2020

(51) Int. Cl.
*B08B 3/02* (2006.01)
*B08B 5/02* (2006.01)
(Continued)

(52) U.S. Cl.
CPC ............... *G01S 7/497* (2013.01); *B08B 3/02* (2013.01); *B08B 5/02* (2013.01); *G01S 7/4813* (2013.01); *G01S 17/86* (2020.01); *H04N 5/2252* (2013.01); *B08B 2203/0211* (2013.01); *B60S 1/52* (2013.01); *B60S 1/54* (2013.01); *B60S 1/60* (2013.01); *G01S 2007/4977* (2013.01)

(58) Field of Classification Search
CPC ...... B60S 1/52; B60S 1/54; B60S 1/56; B60S 1/60; G02B 27/006; B08B 5/02; B08B 3/02; B08B 2203/0211; G01S 7/497; G01S 7/4813; G01S 17/86; G01S 2007/4977; H04N 5/2252
See application file for complete search history.

(56) References Cited

U.S. PATENT DOCUMENTS 4,414,576 A * 11/1983 Randmae ......... G08B 13/19619
                                              219/520
9,409,529 B2    8/2016 Dziurda et al.
(Continued)

FOREIGN PATENT DOCUMENTS

| EP | 2605043 A1 * | 6/2013 | ............ G01S 17/936 |
| KR | 101499607 B1 * | 3/2015 | ............... H04N 7/18 |
| WO | WO-2018130610 A1 * | 7/2018 | ............. B60R 11/04 |

OTHER PUBLICATIONS

KR101499607—Machine Translation (Year: 2015).*

*Primary Examiner* — Marc Lorenzi
(74) *Attorney, Agent, or Firm* — Frank A. MacKenzie; Bejin Bieneman PLC

(57) ABSTRACT

A sensor assembly includes a housing including a first chamber and a second chamber fluidly connected to the first chamber, a first sensor disposed in the second chamber and including a first sensor window facing outward from the second chamber, and a second sensor outside and fixed relative to the first chamber and the second chamber. The second sensor includes a second sensor window. The housing includes an intake from an exterior environment to the first chamber, a first outlet from the second chamber to the exterior environment, and a second outlet from the second chamber to the exterior environment. The first outlet is positioned to direct air across the first sensor window, and the second outlet is positioned to direct air across the second sensor window.

18 Claims, 4 Drawing Sheets

(51) Int. Cl.
  *G01S 7/497*    (2006.01)
  *G01S 17/02*    (2020.01)
  *G01S 7/481*    (2006.01)
  *H04N 5/225*    (2006.01)
  *G01S 17/86*    (2020.01)
  *B60S 1/60*     (2006.01)
  *B60S 1/54*     (2006.01)
  *B60S 1/52*     (2006.01)

(56) References Cited

U.S. PATENT DOCUMENTS

| | | |
|---|---|---|
| 9,707,896 B2 | 7/2017 | Boegel et al. |
| 9,838,653 B2 | 12/2017 | Fish, Jr. et al. |
| 10,011,251 B2 | 7/2018 | Gokan et al. |
| 10,109,104 B2 | 10/2018 | Newman et al. |
| 10,189,450 B2 | 1/2019 | Rice |
| 10,220,817 B2 | 3/2019 | Rice |
| 2011/0216504 A1* | 9/2011 | Alm .................... G08B 29/24 361/695 |
| 2017/0021810 A1 | 1/2017 | Trebouet et al. |
| 2017/0028936 A1* | 2/2017 | Matsumoto ............ G03B 17/08 |
| 2017/0313286 A1 | 11/2017 | Galera et al. |
| 2019/0008345 A1 | 1/2019 | Schmidt et al. |
| 2019/0071058 A1* | 3/2019 | Grasso .................... B60S 1/52 |
| 2019/0302449 A1* | 10/2019 | Bombini ................ B60R 11/04 |
| 2019/0310470 A1* | 10/2019 | Weindorf ................ B60S 1/56 |
| 2020/0298283 A1* | 9/2020 | Saito ....................... B08B 3/02 |

\* cited by examiner

SENSOR ASSEMBLY WITH CLEANING

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
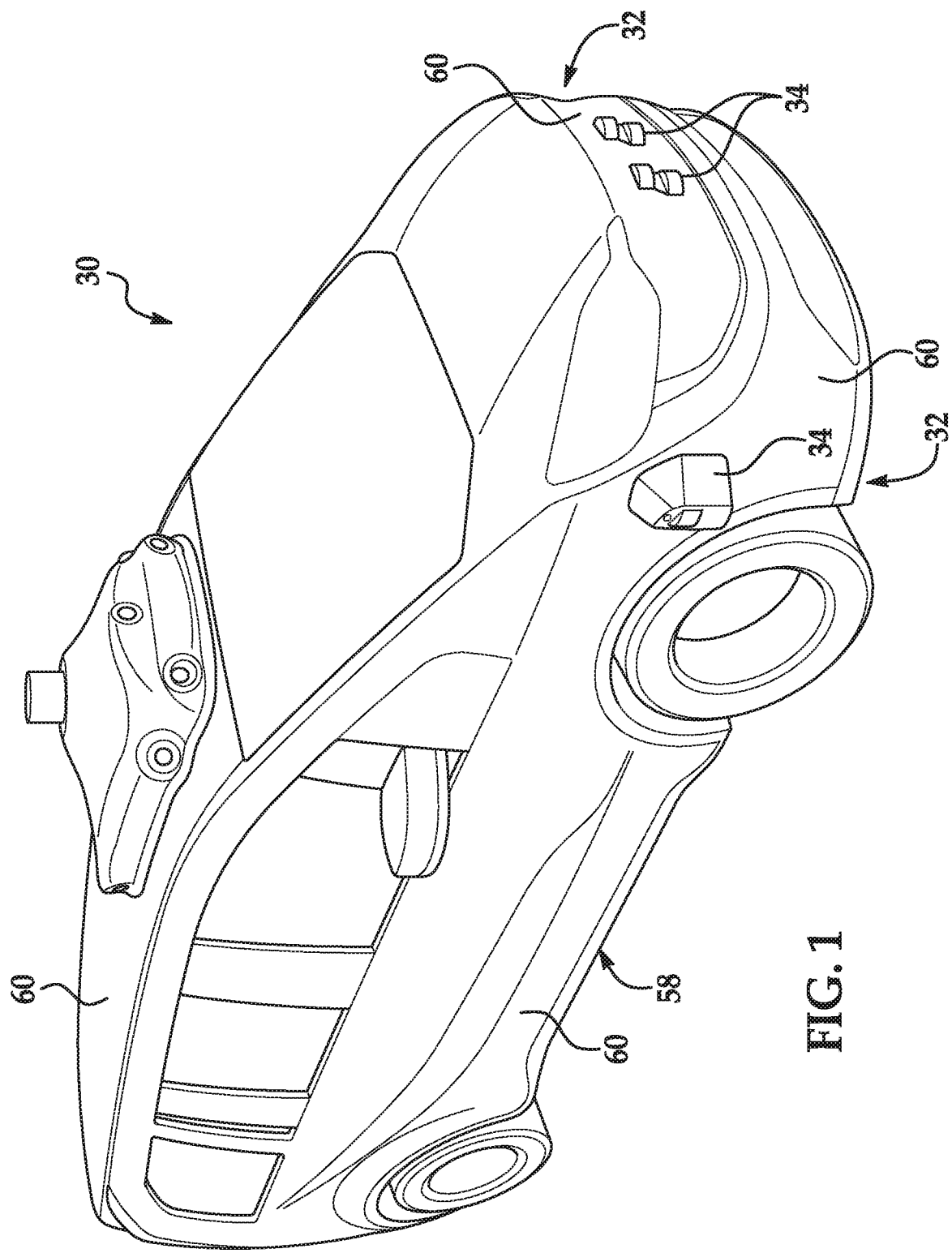
FIG. 1 is a perspective view of an example vehicle.

A sensor assembly includes a housing including a first chamber and a second chamber fluidly connected to the first chamber, a first sensor disposed in the second chamber and including a first sensor window facing outward from the second chamber, and a second sensor outside and fixed relative to the first chamber and the second chamber, the second sensor including a second sensor window. The housing includes an intake from an exterior environment to the first chamber, a first outlet from the second chamber to the exterior environment, and a second outlet from the second chamber to the exterior environment. The first outlet is positioned to direct air across the first sensor window, and the second outlet is positioned to direct air across the second sensor window.

The sensor assembly may further include a blower having a blower inlet in the first chamber and a blower outlet in the second chamber. The first chamber may include a duct leading from the intake to the blower inlet, and the second chamber may include a wall shared with the duct. The intake may be a first intake, the duct may be a first duct, the housing may include a second intake from the exterior environment to the first chamber, and the first chamber may include a second duct leading from the second intake to the blower inlet. The wall may be a first wall, and the second chamber may include a second wall shared with the second duct.

The housing may include a front wall, the first sensor window may be aimed through the front wall, and the first intake and second intake may pass through the front wall.

The housing may include a first side wall, a back wall extending from the first side wall, and a second side wall extending from the back wall, and the first side wall, back wall, and second side wall may at least partially form the first chamber. The first side wall may at least partially form the first duct, and the second side wall may at least partially form the second duct.

The sensor assembly may further include a bracket fixed to the second chamber inside the second chamber, and the bracket may hold the first sensor. The sensor assembly may further include a liquid nozzle held by the bracket and aimed at the first sensor window.

The sensor assembly may further include a liquid nozzle held by the bracket and aimed at the second sensor window.

The housing may include a front wall, the first sensor window may be aimed through the front wall, and the first outlet may be formed of the front wall and the bracket.

The sensor assembly may further include at least one tube extending along an edge of the second sensor window, and the at least one tube may include a plurality of liquid outlets aimed at the second sensor window. The sensor assembly may further include a third sensor window fixed relative to the second sensor window, and the at least one tube may extend between the second sensor window and the third sensor window, and the at least one tube may include a plurality of liquid outlets aimed at the third sensor window.

The housing may include a front wall, the first sensor window may be aimed through the front wall, and the intake may pass through the front wall.

The first outlet may be slot-shaped.

The second outlet may be slot-shaped.

The first sensor may be a camera.

The second sensor may be a LIDAR sensor.

With reference to the Figures, a sensor assembly 32 for a vehicle 30 includes a housing 34 including a first chamber 36 and a second chamber 38 fluidly connected to the first chamber 36, a first sensor 40 disposed in the second chamber 38 and including a first sensor window 42 facing outward from the second chamber 38, and a second sensor 44 outside and fixed relative to the first chamber 36 and the second chamber 38. The second sensor 44 includes a second sensor window 46. The housing 34 includes at least one intake from an exterior environment to the first chamber 36, a first outlet 52 from the second chamber 38 to the exterior environment, and a second outlet 54 from the second chamber 38 to the exterior environment. The first outlet 52 is positioned to direct air across the first sensor window 42, and the second outlet 54 is positioned to direct air across the second sensor window 46.

The sensor assembly 32 can provide an efficiently packaged collection of sensors 40, 44 and cleaning apparatus for the sensors 40, 44. The sensor assembly 32 can reduce complexity, number of components, and volume occupied compared with the same types of sensors 40, 44 located separately on the vehicle 30. The sensor assembly 32 can provide a single mechanism for simultaneously cleaning the first sensor window 42 and the second sensor window 46.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems based on data from sensors such as the first sensor 40, the second sensor 44, and a third sensor 56. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 58. The vehicle 30 may be of a unibody construction, in which a frame and a body 58 of the vehicle 30 are a single component. The vehicle 30 may, alternatively, be of a body-on-frame construction, in which the frame supports a body 58 that is a separate component from the frame. The frame and body 58 may be formed of any suitable material, for example, steel, aluminum, etc. The body 58 includes body panels 60 partially defining an exterior of the vehicle 30. The body panels 60 may present a class-A surface, e.g., a finished surface exposed to view by a customer and free of unaesthetic blemishes and defects.

The housing 34 is disposed on one of the body panels 60. For example, the housing 34 can be disposed on a front end of the vehicle 30 below a beltline of the vehicle 30, as shown in FIG. 1. While the discussion below is with respect to a single sensor assembly 32, the vehicle 30 can include multiple sensor assemblies 32, each with one housing 34 disposed on one of the body panels 60. The housings 34 can be arranged to provide the respective sensors 40, 44, 56 with a collective field of view entirely around the front end of the vehicle 30.

Figure 2:
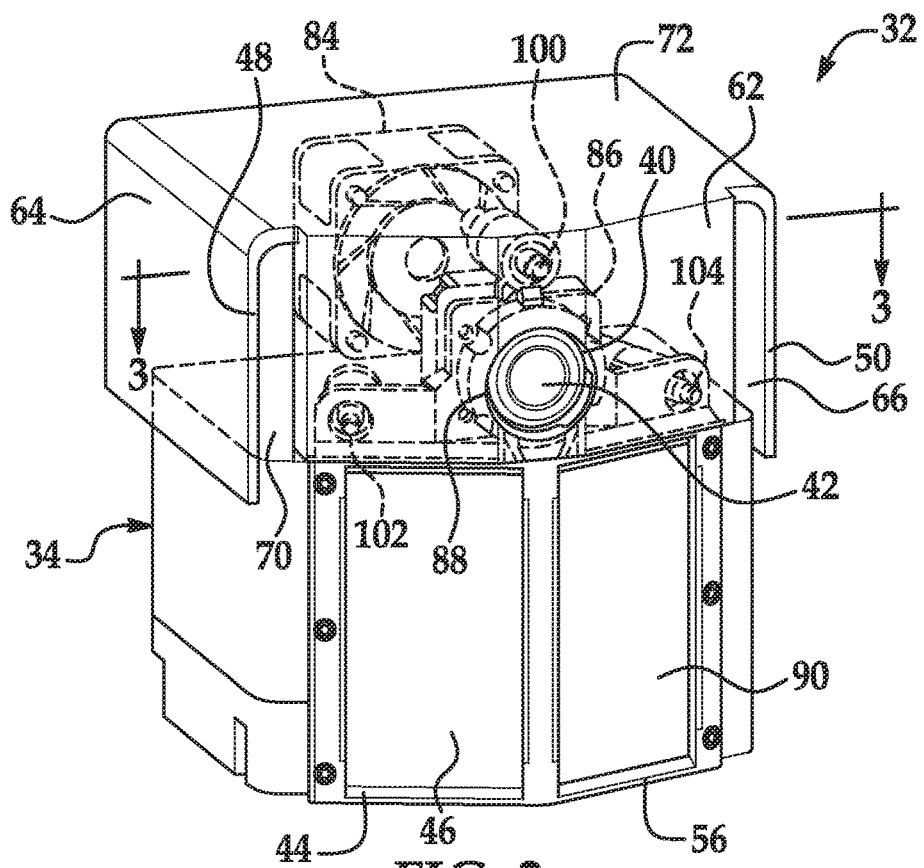
FIG. 2 is a perspective view of a sensor assembly of the vehicle with an example air distribution system and an example liquid distribution system.
Figure 3:
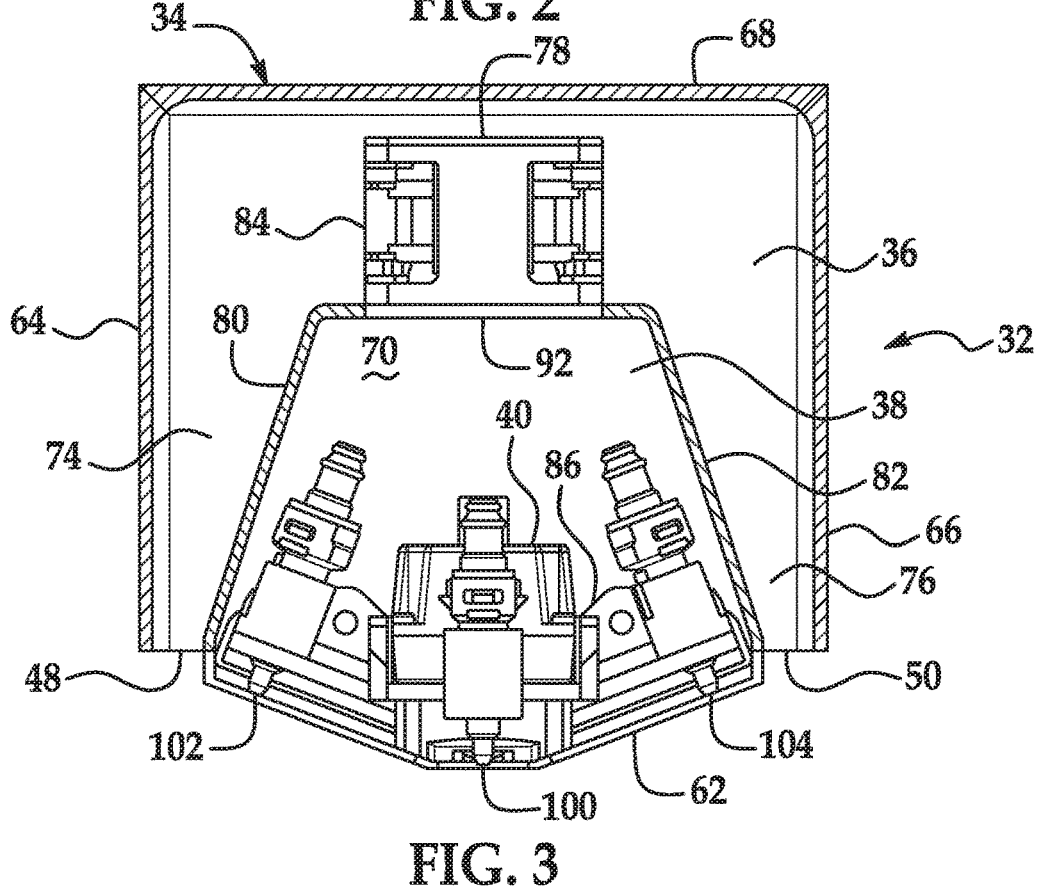
FIG. 3 is a top cross-sectional view of the sensor assembly.

With reference to FIGS. 2-3, the housing 34 includes a front wall 62, a first side wall 64, a second side wall 66, a back wall 68, a chamber floor 70, and a chamber ceiling 72. The walls 62, 64, 66, 68 extend vertically from the chamber floor 70 to the chamber ceiling 72. The walls 62, 64, 66, 68 and the chamber ceiling 72 partially form an exterior of the housing 34. The front wall 62 faces away from the body 58 of the vehicle 30, i.e., away the body panel 60 to which the housing 34 is mounted, and the back wall 68 faces toward the body 58 of the vehicle 30, i.e., toward the body panel 60 to which the housing 34 is mounted. The first side wall 64 and second side wall 66 extend from the front wall 62 (or from the intakes 48, 50 through the front wall 62) to the back wall 68. The back wall 68 extends from the first side wall 64 to the second side wall 66. The chamber floor 70 and the chamber ceiling 72 are parallel to each other, and the first side wall 64 and the second side wall 66 are parallel to each other. The walls 62, 64, 66, 68, the chamber floor 70, and the chamber ceiling 72 collectively enclose the first chamber 36 and the second chamber 38.

The intakes 48, 50 pass through the front wall 62 from an exterior environment to the first chamber 36. The intakes 48, 50 include a first intake 48 and a second intake 50. The first intake 48 passes through the front wall 62 adjacent to the first side wall 64, and the second intake 50 passes through the front wall 62 adjacent to the second side wall 66. The intakes 48, 50 are slot-shaped and oriented vertically. The intakes 48, 50 extend from the chamber floor 70 to the chamber ceiling 72.

The housing 34 includes the first chamber 36. The first side wall 64, the back wall 68, the second side wall 66, the chamber floor 70, and the chamber ceiling 72 partially form the first chamber 36. The first chamber 36 includes a first duct 74 and a second duct 76, as shown in FIG. 3. The first duct 74 leads from the first intake 48 to a blower inlet 78, and the second duct 76 leads from the second intake 50 to the blower inlet 78. The first duct 74 is formed of the first side wall 64, the back wall 68, the chamber floor 70, the chamber ceiling 72, and a first internal wall 80. The second duct 76 is formed of the second side wall 66, the back wall 68, the chamber floor 70, the chamber ceiling 72, and a second internal wall 82. The first internal wall 80 and second internal wall 82 extend from the front wall 62 toward the back wall 68 to a blower 84. The first internal wall 80 angles away from the first side wall 64 from the front wall 62 toward the back wall 68, and the second internal wall 82 angles away from the second side wall 66 from the front wall 62 toward the back wall 68. The cross-sectional area of each of the ducts 74, 76 increases from the front wall 62 to the back wall 68.

The housing 34 includes the second chamber 38. The front wall 62, the first internal wall 80, the second internal wall 82, the chamber floor 70, and the chamber ceiling 72 form the second chamber 38. The first internal wall 80 is shared by the second chamber 38 and the first duct 74, and the second internal wall 82 is shared by the second chamber 38 and the second duct 76.

The first chamber 36 and the second chamber 38 are fluidly connected to each other via the blower 84. The blower 84 includes the blower inlet 78 in the first chamber 36 and the blower outlet 92 in the second chamber 38. The first chamber 36 and the second chamber 38 are fluidly isolated from each other except through the blower 84 and the external environment. The blower 84 draws in air from the first chamber 36 through the blower inlet 78 and expels air into the second chamber 38 through the blower outlet 92. The blower 84 is any suitable type of blower, e.g., a fan-type blower, etc.

A bracket 86 is disposed inside the second chamber 38. The bracket 86 is fixed to the second chamber 38, e.g., to the chamber floor 70 and/or the front wall 62. For example, the bracket 86 can be bolted to an inside of the front wall 62.

Figure 4:
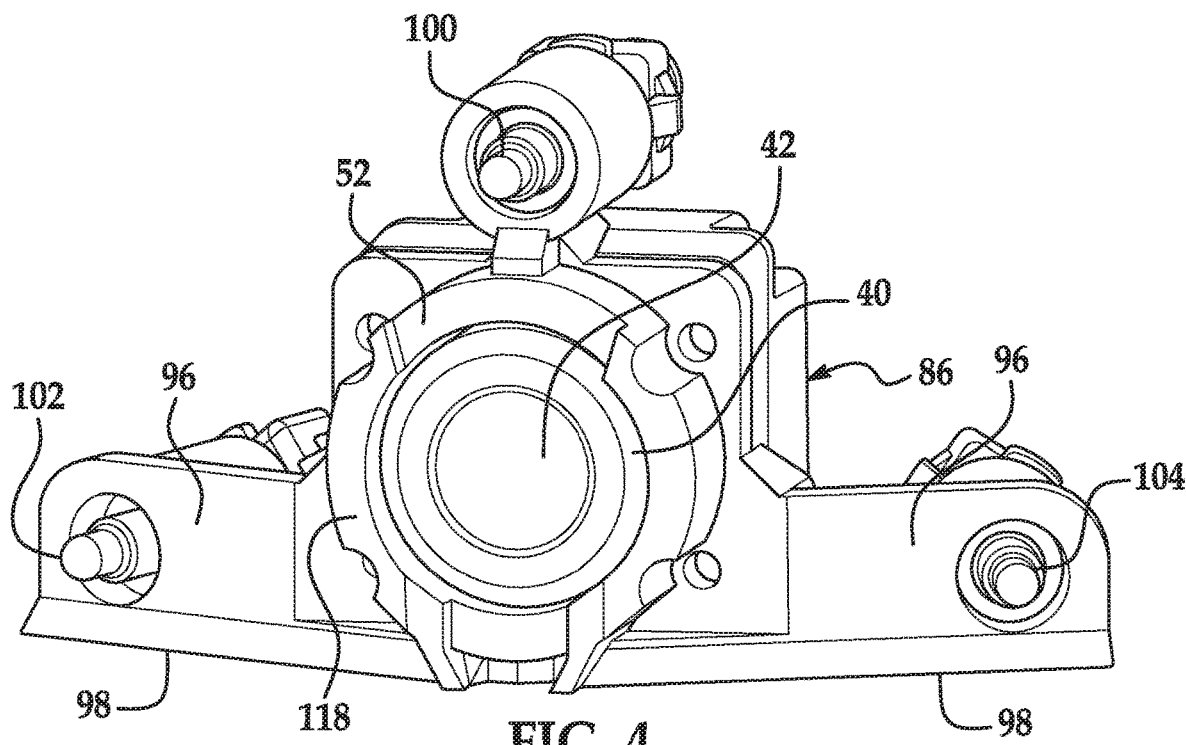
FIG. 4 is a perspective view of a bracket of the sensor assembly with a sensor and nozzles.

With reference to FIG. 4, the bracket 86 holds the first sensor 40. For example, the first sensor 40 can be press-fit into an opening through the bracket 86. The bracket 86 fixes the position of the first sensor 40 relative to the housing 34. The first sensor 40 is disposed in the second chamber 38.

The first sensor 40 detects the external world, e.g., objects and/or characteristics of surroundings of the vehicle 30, such as other vehicles, road lane markings, traffic lights and/or signs, pedestrians, etc. For example, the first sensor 40 can be a radar sensor, a scanning laser range finder, a light detection and ranging (LIDAR) device, or an image processing sensor such as a camera. In particular, the first sensor 40 can be a camera.

Figure 5:
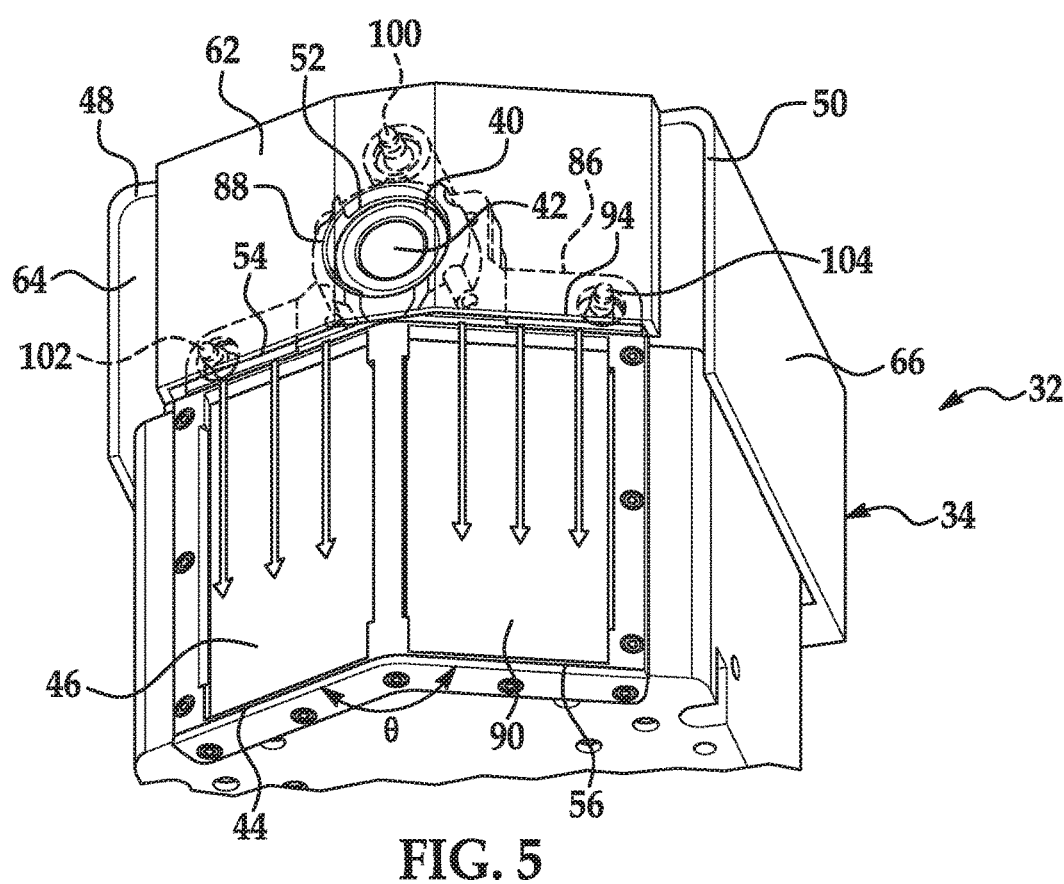
FIG. 5 is a bottom perspective view of the sensor assembly.

The first sensor 40 includes the first sensor window 42. The first sensor window 42 faces outward from the second chamber 38 through the front wall 62, i.e., the first sensor window 42 is aimed through the front wall 62, e.g., through a first opening 88 in the front wall 62, as shown in FIGS. 2 and 5. The first sensor window 42 can be, e.g., a camera lens.

With reference to FIG. 5, the second sensor 44 and the third sensor 56 are disposed in the housing 34 and outside the first chamber 36 and second chamber 38. For example, the second sensor 44 and the third sensor 56 are disposed below the chamber floor 70. The second sensor 44 and the third sensor 56 are fixed relative to the first chamber 36 and second chamber 38 of the housing 34. The second sensor 44 and the third sensor 56 can be disposed laterally from each other with respect to the housing 34, i.e., disposed along a line perpendicular to the direction that the first sensor 40 is aimed and parallel to the chamber floor 70.

The second sensor 44 and third sensor 56 detect the external world, e.g., objects and/or characteristics of surroundings of the vehicle 30, such as other vehicles, road lane markings, traffic lights and/or signs, pedestrians, etc. For example, the second sensor 44 and third sensor 56 can be radar sensors, scanning laser range finders, light detection and ranging (LIDAR) devices, or image processing sensors such as cameras. In particular, the second sensor 44 and third sensor 56 can be LIDAR sensors, e.g., scanning LIDAR devices. A LIDAR device detects distances to objects by emitting laser pulses at a particular wavelength and measuring the time of flight for the pulse to travel to the object and back.

The second sensor 44 includes the second sensor window 46, and the third sensor 56 includes a third sensor window 90. The second sensor window 46 and third sensor window 90 are fixed relative to the first sensor window 42 and relative to each other. The second sensor window 46 and third sensor window 90 are positioned below the first chamber 36 and the second chamber 38. The second sensor window 46 and third sensor window 90 extend from the chamber floor 70 away from the first chamber 36 and second chamber 38.

The second sensor window 46 has a flat rectangular shape and defines a first plane. The third sensor window 90 has a flat rectangular shape and defines a second plane different than the first plane. An angle θ defined by the second sensor window 46 and the third sensor window 90, i.e., an angle θ at which the first plane and the second plane would intersect, is obtuse.

The housing 34 includes the first outlet 52 from the second chamber 38 to the exterior environment. The first outlet 52 is positioned to direct air across the first sensor window 42. The first outlet 52 is slot-shaped. The first outlet 52 is formed of the front wall 62 and the bracket 86. The bracket 86 includes a lip 118 positioned flush against the front wall 62 and extending partially around the first opening 88. The first outlet 52 is a gap in the lip 118. If the first opening 88 has a circular shape, the lip 118 may extend approximately 270° around the first opening 88, and the first outlet 52 may extend approximately the other 90° around the first opening 88.

The housing 34 includes the second outlet 54 and a third outlet 94 from the second chamber 38 to the exterior environment. The second outlet 54 is positioned to direct air across the second sensor window 46, and the third outlet 94 is positioned to direct air across the third sensor window 90. The second outlet 54 and third outlet 94 are slot-shaped. The second outlet 54 and third outlet 94 are formed of the front wall 62 and the bracket 86. The bracket 86 includes front surfaces 96 each extending parallel to the front wall 62 and defining a constant-width gap with the front wall 62. The bracket 86 includes ramps 98 angled from the front surfaces 96 toward the front wall 62 at a bottom of the bracket 86 and defining a narrower gap with the front wall 62 than the constant-width gap. The second outlet 54 is formed of the ramp 98 and the front wall 62 directly above the second sensor window 46, and the third outlet 94 is formed of the ramp 98 and the front wall 62 directly above the third sensor window 90. The second outlet 54 extends along an entirety of a width of the second sensor window 46, and the third outlet 94 extends along an entirety of a width of the third sensor window 90.

The operation of the blower 84 pushes air from the first chamber 36 into the second chamber 38. The blower 84 thus draws air from the exterior environment into the first chamber 36 via the intakes 48, 50. The blower 84 raises the air pressure of the second chamber 38 above the air pressure of the exterior environment, i.e., above the ambient air pressure. The higher air pressure forces air out the first outlet 52, the second outlet 54, and the third outlet 94, providing air curtains across the first sensor window 42, the second sensor window 46, and the third sensor window 90. The air curtains can push debris off of the sensor windows 42, 46, 90 and can prevent debris from contacting the sensor windows 42, 46, 90.

With continued reference to FIG. 5, in a first example of providing liquid such as washer fluid to the sensor windows 42, 46, 90, the sensor assembly 32 includes a first liquid nozzle 100, a second liquid nozzle 102, and a third liquid nozzle 104. The liquid nozzles 100, 102, 104 are held by the bracket 86 and extend through the front wall 62. For example, the liquid nozzles 100, 102, 104 can be attached to the bracket 86 with a press fit or a snap fit. The first liquid nozzle 100 is disposed above the first sensor 40 and aimed at the first sensor window 42. The second liquid nozzle 102 and third liquid nozzle 104 are disposed laterally from the first sensor 40 and extend from the front surfaces 96 of the bracket 86. The second liquid nozzle 102 is disposed above the second sensor 44 and aimed at the second sensor window 46, and the third liquid nozzle 104 is disposed above the third sensor 56 and aimed at the third sensor window 90.

Figure 6:
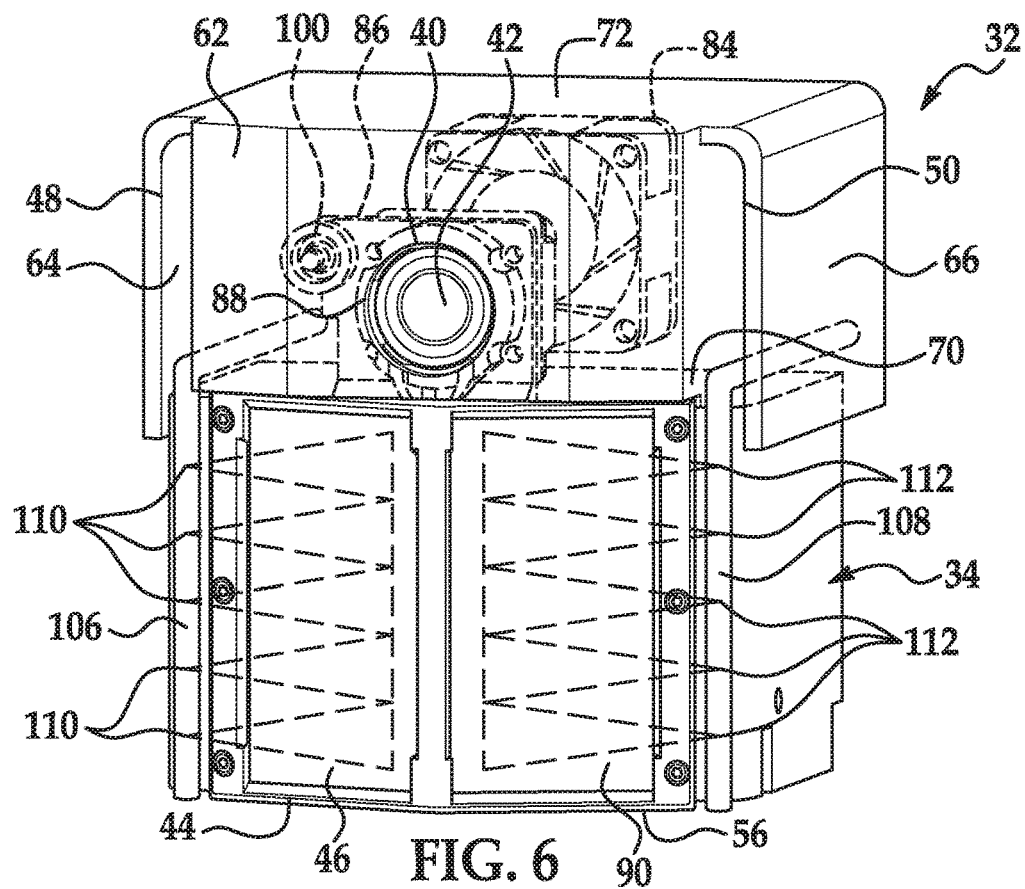
FIG. 6 is a perspective view of the sensor assembly with another example liquid distribution system.

With reference to FIG. 6, in a second example of providing liquid to the sensor windows 42, 46, 90, the sensor assembly 32 includes the first liquid nozzle 100, a second tube 106, and a third tube 108. (The term "first tube" is skipped so that the naming of the tubes 106, 108 is consistent with the naming of the second sensor window 46 and third sensor window 90.) The first liquid nozzle 100 is held by the bracket 86 and extends through the front wall 62. For example, the first liquid nozzle 100 can be attached to the bracket 86 with a press fit or a snap fit. The first liquid nozzle 100 is disposed above and laterally of the first sensor 40 and aimed at the first sensor window 42.

The second tube 106 extends along an edge of the second sensor window 46, e.g., an edge farthest from the third sensor window 90, and the third tube 108 extends along an edge of the third sensor window 90, e.g., an edge farthest from the second sensor window 46. The second tube 106 includes a plurality of second liquid outlets 110 aimed at the second sensor window 46, and the third tube 108 includes a plurality of third liquid outlets 112 aimed at the third sensor window 90. The second and third liquid outlets 110, 112 are arranged in sequence along the second and third tubes 106, 108, respectively.

Figure 7:
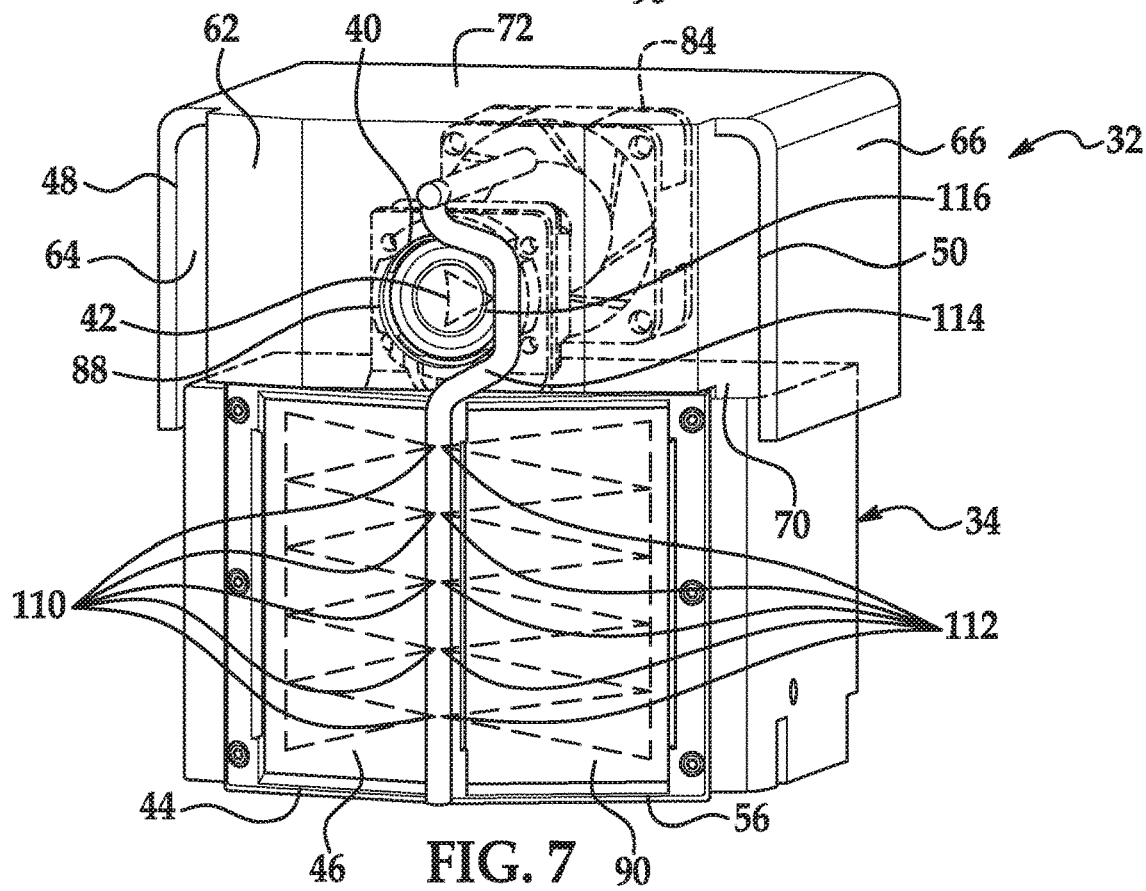
FIG. 7 is a perspective view of the sensor assembly with another example liquid distribution system.

With reference to FIG. 7, in a third example of providing liquid to the sensor windows 42, 46, 90, the sensor assembly 32 includes a single tube 114. The tube 114 extends partially along the first opening 88 and along parallel adjacent edges of the second sensor window 46 and third sensor window 90. In particular, the same section of the tube 114 extends along an edge of the second sensor window 46 nearest the third sensor window 90 and along an edge of the third sensor window 90 nearest the second sensor window 46. The tube 114 includes a plurality of first liquid outlets 116 aimed at the first sensor window 42, a plurality of second liquid outlets 110 aimed at the second sensor window 46, and a plurality of third liquid outlets 112 aimed at the third sensor window 90. The second liquid outlets 110 and third liquid outlets 112 are arranged in sequence on opposite side of the same section of the tube 114.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor assembly comprising:
a housing including a first chamber and a second chamber, the second chamber fluidly connected to the first chamber;
a first sensor disposed in the second chamber and including a first sensor window facing outward from the second chamber;
a second sensor outside the first chamber and the second chamber, the second sensor being fixed relative to the first chamber and the second chamber, the second sensor including a second sensor window; and
a blower having a blower inlet in the first chamber and a blower outlet in the second chamber;
wherein the housing includes an intake from an exterior environment to the first chamber, a first outlet from the second chamber to the exterior environment, and a second outlet from the second chamber to the exterior environment;
the first outlet is positioned to direct air across the first sensor window; and
the second outlet is positioned to direct air across the second sensor window.

2. The sensor assembly of claim 1, wherein the first chamber includes a duct leading from the intake to the blower inlet, and the second chamber includes a wall shared with the duct.

3. The sensor assembly of claim 2, wherein the intake is a first intake, the duct is a first duct, the housing includes a second intake from the exterior environment to the first chamber, and the first chamber includes a second duct leading from the second intake to the blower inlet.

4. The sensor assembly of claim 2, wherein the wall is a first wall, and the second chamber includes a second wall shared with the second duct.

5. The sensor assembly of claim 2, wherein the housing includes a front wall, the first sensor is aimed through the front wall, and the front wall edge of the first intake and second intake.

6. The sensor assembly of claim 3, wherein:
the housing includes a first side wall, a back wall extending from the first side wall, and a second side wall extending from the back wall; and
the first side wall, back wall, and second side wall at least partially form the first chamber.

7. The sensor assembly of claim 6, wherein the first side wall at least partially forms the first duct, and the second side wall at least partially forms the second duct.

8. The sensor assembly of claim 1, further comprising a bracket fixed to the second chamber inside the second chamber, wherein the bracket holds the first sensor.

9. The sensor assembly of claim 8, further comprising a liquid nozzle held by the bracket and aimed at the first sensor window.

10. The sensor assembly of claim 8, further comprising a liquid nozzle held by the bracket and aimed at the second sensor window.

11. The sensor assembly of claim 8, wherein the housing includes a front wall, the first sensor is aimed through the front wall, and the first outlet is formed of the front wall and the bracket.

12. The sensor assembly of claim 1, further comprising at least one tube extending along an edge of the second sensor window, wherein the at least one tube includes a plurality of liquid outlets aimed at the second sensor window.

13. The sensor assembly of claim 12, further comprising a third sensor window fixed relative to the second sensor window, wherein the at least one tube extends between the second sensor window and the third sensor window, and the at least one tube includes a plurality of liquid outlets aimed at the third sensor window.

14. The sensor assembly of claim 1, wherein the housing includes a front wall, the first sensor is aimed through the front wall, and the front wall defines an edge of the intake.

15. The sensor assembly of claim 1, wherein the first outlet is slot-shaped.

16. The sensor assembly of claim 1, wherein the second outlet is slot-shaped.

17. The sensor assembly of claim 1, wherein the first sensor is a camera.

18. The sensor assembly of claim 1, wherein the second sensor is a LIDAR sensor.

* * * * *